United States Patent [19]

Tokuda

[11] Patent Number: 5,012,782
[45] Date of Patent: May 7, 1991

[54] ENGINE CONTROL SYSTEM

[75] Inventor: Shoji Tokuda, Hiroshima, Japan

[73] Assignee: Mazda Motor Corporation, Hiroshima, Japan

[21] Appl. No.: 394,083

[22] Filed: Aug. 15, 1989

[30] Foreign Application Priority Data

Aug. 15, 1988 [JP] Japan .................. 63-202851

[51] Int. Cl.$^5$ .................................................. F02P 5/18
[52] U.S. Cl. .................................................. 123/425
[58] Field of Search ............... 123/425, 435, 416, 417, 123/198 D

[56] References Cited

U.S. PATENT DOCUMENTS

| | | | |
|---|---|---|---|
| 4,715,342 | 12/1987 | Nagas | 123/425 |
| 4,716,873 | 1/1988 | Takabe et al. | 123/416 |
| 4,790,281 | 12/1988 | Miano et al. | 123/425 |
| 4,821,697 | 4/1989 | McDougal | 123/980 |
| 4,825,832 | 5/1989 | Satoh et al. | 123/417 |
| 4,843,916 | 7/1989 | Bouta | 123/425 |
| 4,848,299 | 7/1989 | Satoh et al. | 123/425 |
| 4,854,286 | 8/1989 | Chamnitzer | 123/425 |
| 4,856,481 | 8/1989 | Kamise et al. | 123/425 |

FOREIGN PATENT DOCUMENTS 60-216067 10/1985 Japan .

Primary Examiner—Raymond A. Nelli
Attorney, Agent, or Firm—Fleit, Jacobson, Cohn, Price, Holman & Stern

[57] ABSTRACT

An engine control system for an internal combustion system changes an initially set control value either to a specified control value suitable for a grade of gasoline having a low octane rating when an engine operating condition is in a first operating zone for knocking detection ranging over a specific engine load and under a specific engine speed or to another specified value suitable for another grade of gasoline having a high octane rating when an engine operating condition is in a second operating zone for knocking detection ranging over the specific engine speed. Grades of gasoline delivered to the internal combustion engine are discriminated based on the frequency of knockings continually detected by a knock sensor. Gasoline delivered to the internal combustion engine is regarded as having a high octane rating when the frequency of knockings is at low level or as having a low octane rating when when the frequency of knockings is at a high level.

16 Claims, 6 Drawing Sheets

ENGINE CONTROL SYSTEM

FIELD OF THE INVENTION

The present invention relates to a control system for controlling an internal combustion engine for automotive vehicles, and more particularly to a control system for changing engine control values at which the internal combustion engine is operated in accordance with knocking caused in the internal combustion engine.

BACKGROUND OF THE INVENTION

In recent years, to cope with the use of various grades of gasoline such as regular, unleaded and premium which are assigned an octane rating for an internal combustion engine, it has increasingly become popular to change engine operating conditions or engine control values, for example ignition timing, supercharging pressure, etc., according to the grade of gasoline delivered to the internal combustion engine.

Detection of the octane rating of a gasoline in use can be effected in various manners. One popular manner of identifying the octane rating of gasoline is to detect knockings occurring in the internal combustion engine. For this, it is common to detect a knocking or knockings in different two engine operating zones: a first zone where the internal combustion engine operates under a relatively high engine load and at a speed under a specific engine speed, and a second zone where the engine operates at a speed over the the specific engine speed. The specific engine speed is so determined that the loudness of noise produced in the engine operating at the specific engine speed does not affect the detection of engine knockings.

Engine knockings caused in the second operating zone are more apt to have an adverse effect on the performance of an engine. Engine knockings caused in some engine operating conditions, although inducing no trouble in the engine operating in the same engine operating condition in the first operating zone, can possibly cause, but seldom actually cause, damage to the engine in the second operating zone. An engine operating condition is, on the other hand, possibly changed directly into the second operating zone without passing through the first operating zone. If an engine control value or values for the engine, although a low octane rating of gasoline is practically used in the engine, has or have been set suitably for a high octane rating of gasoline, the engine is more apt to cause knockings, resulting in difficulty in ensuring the performance of engine.

In an attempt at avoiding that difficulty, it is proposed in, for example Japanese Unexamined Patent Publication No. 60(1985)-216,067 entitled "Ignition Timing Control System for Internal Combustion Engine" laid open Oct. 29, 1985, that an engine control value in the second operating zone should be initially set and maintained suitably for a low octane rating gasoline unless the gasoline in use is determined to be of a high octane rating gasoline when the engine operating condition is changed to the first operating zone.

To realize a high efficiency of the use of engine output, it is generally preferable to set the engine control value suitably for a high octane rating of gasoline as long as a high octane rating of gasoline is practically used. However, from the standpoint of the reliability of performance of an engine in the second operating zone, unrestricted change of the engine control value to a value suitable for a high octane rating of gasoline should be avoided.

SUMMARY OF THE INVENTION

The primary object of the present invention is to provide an internal combustion engine cooperating with a novel control system for changing an engine control value, at which the internal combustion engine is operated, in accordance with the occurrence of knockings in the internal combustion engine so as to ensure the reliable performance of the internal combustion engine.

The object of the present invention is achieved by an engine control system for an internal combustion system having engine control value changing means for changing an engine control value initially set either to a predetermined value suitable for a grade of gasoline when an engine operating condition is in a first operating zone ranging over a specific engine load and under a specific engine speed or to another predetermined value suitable for another grade of gasoline. The initially set engine operating value is set either to a value predetermined suitably for a gasoline having a low octane rating when the internal combustion engine is operated in the first operating zone or a value predetermined suitably for a gasoline having a high octane rating when the internal combustion engine is operated in a second operating zone ranging over the specific engine speed.

The grade of gasoline delivered to the internal combustion engine is discriminated based on the frequency of knockings continually detected by a knock sensor. Gasoline delivered to the internal combustion engine is regarded as having a high octane rating when the frequency of knockings is at a low level or as having a low octane rating when when the frequency of knockings is at a high level.

According to the engine control system of the present invention, in the first operating zone where knockings caused in the internal combustion engine induce fewer adverse effects on the reliable performance of the internal combustion engine relative to the second operating zone, opportunities for setting an engine control value to a predetermined value suitable for a gasoline having a high octane rating can be brought about even at a high frequency of knockings. On the other hand, in the second operating zone, an engine control value is set to a predetermined value suitable for a gasoline having a low octane rating, thereby preventing with certainty the internal combustion engine from being damaged due to knockings even at a very low frequency of knockings. In particular, when different grades of gasolines are used, such as a high octane rating and a low octane rating gasoline, the predetermined value suitable for the gasoline having a high octane rating is more often set in the first operating zone. In this manner, the internal combustion engine controlled by the engine control system of the present invention can ensure both running efficiency by considering engine output and also engine performance reliability by prevention against knockings.

BRIEF DESCRIPTION OF THE DRAWINGS

The above and other objects and features of the invention will become apparent to those skilled in the art from the following description of a preferred embodiment when taken in conjunction with the accompanying drawings wherein, in which.

DESCRIPTION OF THE PREFERRED EMBODIMENT

An engine control system in accordance with the present invention is incorporated in an internal combustion engine for an automotive vehicle. Because such internal combustion engines are well known, this description will be directed in particular to elements forming part of, or cooperating directly with, elements embodying the present invention. It is to be understood, however, that elements not specifically shown or described may take various forms known to those skilled in the engine art.

Figure 1:
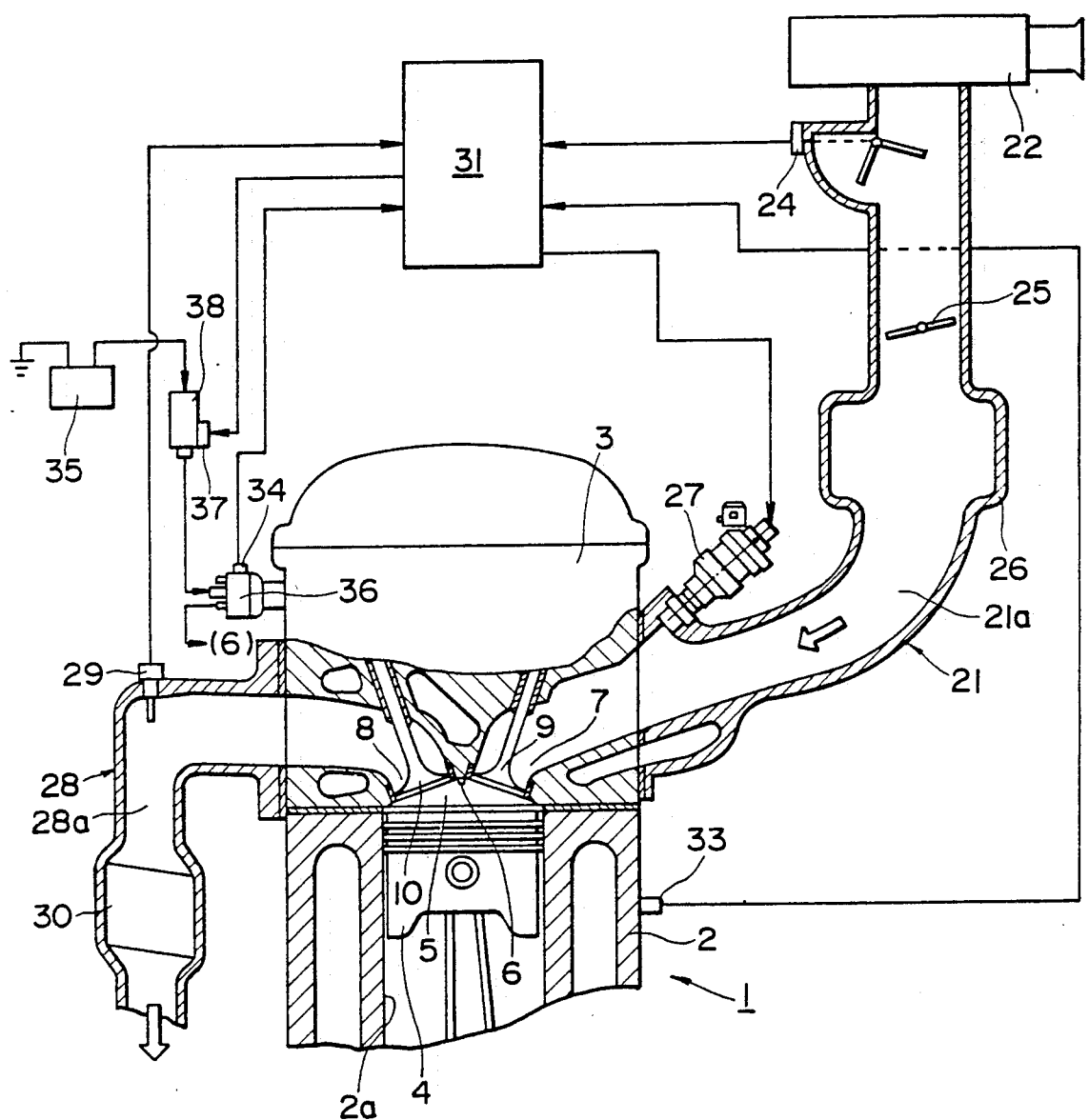
FIG. 1 is a schematic view showing an internal combustion engine provided with an engine control system in accordance with a preferred embodiment of the present invention.

Referring to the drawings in detail, particularly to FIG. 1, an engine body 1 of a four stroke internal combustion engine E of a type having Otto cycle controlled by a control system in accordance with the present invention is partly shown, consisting of a cylinder block 2 and a cylinder head 3. The cylinder block 2 is formed with a plurality of cylinders 2a (one of which appears in FIG. 1). A snug fitting piston 4 is placed into each cylinder 2a. A combustion chamber 5 formed by the cylinder 2a and the piston 4 is in communication with an inlet port 7 to take in fuel mixture into the cylinder 2a and an exhaust port 8 to exhaust burned gas out of the cylinder 2a. A valve system cooperating with an engine crankshaft, which is well known in the art and need not be explained, causes the intake and exhaust valves 9 and 10 to open at proper times. The cylinder 2a is further provided with a spark plug 6 having an electrode tip extending down into the combustion chamber 5.

Intake air is introduced into the cylinder 2a through an intake passage 21a formed by an intake pipe 21 and burned gas is exhausted through an exhaust passage 28a formed by an exhaust pipe 28. Mounted on, or disposed in, the intake pipe 21 are an air cleaner 22, an air flow meter 24, a throttle valve 25, a surge tank 26 and a fuel injector 27 arranged in this order from upstream of the intake passage 21a to downstream of the intake passage. Disposed in the exhaust pipe 28 are an air-fuel ratio (A/F) sensor 29 and a catalytic converter rhodium (CCRO) 30, which is used for emission control, arranged in this order from upstream of the exhaust passage 28a to downstream of the exhaust passage.

Internal combustion engine E is operated by a control unit 31 having a general microcomputer consisting of CPU, RAM and ROM. The control unit 31 is connected to outputs of a knock sensor 33 and an engine speed sensor 34 incorporated in a distributor 36, as well as to outputs of the air flow meter 24 and the air-fuel ratio sensor 29. Control unit 31 also provides an igniter 37 of an ignition coil 38 and the fuel injector 27 with an ignition signal and an injection pulse, respectively. When the igniter 37 receives the ignition signal, a current flow through the primary windings of the ignition coil 38 is interrupted and the ignition coil 38 produces a high voltage in the secondary circuit. The current flowing from the ignition coil 38 is timed and distributed to the spark plugs 6 for the respective cylinders 2a by means of the distributor 36 and jumps from the center electrode of the spark plug 6 to the side, or ground, electrode. When the current jumps in such a manner, it produces a hot spark that ignites the air-fuel mixture in the combustion chamber 5. The control unit 31 also monitors engine speed, load, throttle position, exhaust, temperature, etc. from the sensors in a well known manner. Based on incoming signals from the sensors, the control unit 31 constantly adjusts pulse width so that the injector 27 delivers fuel at a correct air-fuel ratio for any given engine demand. It is to be noted that all of the sensors used in the internal combustion engine E can take any type well known in the art and need not be described in detail herein.

Figure 2:
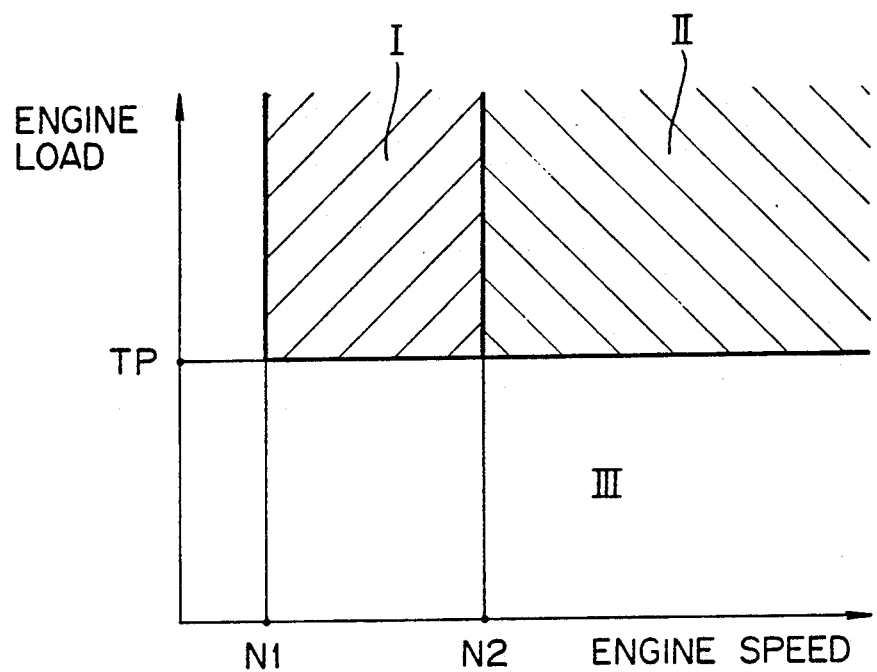
FIG. 2 is a diagram showing engine operating zones for knocking detection.

Referring to FIG. 2, engine operating conditions are divided into three operating zones for engine knocking detection. First, second and third operating zones I, II and III are defined by the use of two parameters, engine speed and engine load. The first zone I is so defined as to range between first and second engine speeds N1 and N2, for example 1000 and 4750 r.p.m., respectively, and over an engine load TP. These first and second engine speeds N1 and N2 and the engine load TP are previously specified. In the first operating zone I, where no effect of knocking on the reliability of engine performance may be encountered, a determination of the octane rating of a gasoline now in use is made based on the occurrence of knocking. The second operating zone II, where knocking is considered to particularly adversely affect the reliability of engine performance, is defined to range over the second specific engine speed N2 and over the specific engine load TP. The third operating zone III covers all of the remaining conditions of engine operation neither included in the first operating zone I nor in the second operating zone II. In the third operating zone III, ignition timing is substantially independent of the octane rating of gasoline.

Ignition timing of the internal combustion engine E, as one of the engine control values, is changed or adjusted in accordance with the octane(rating of gasoline in any on-going engine operating condition for all of the first to third operating zones I to III. However, a decision regarding the change or adjustment of ignition timing is always made depending upon knockings occurring in the first operating zone I.

Figure 3:
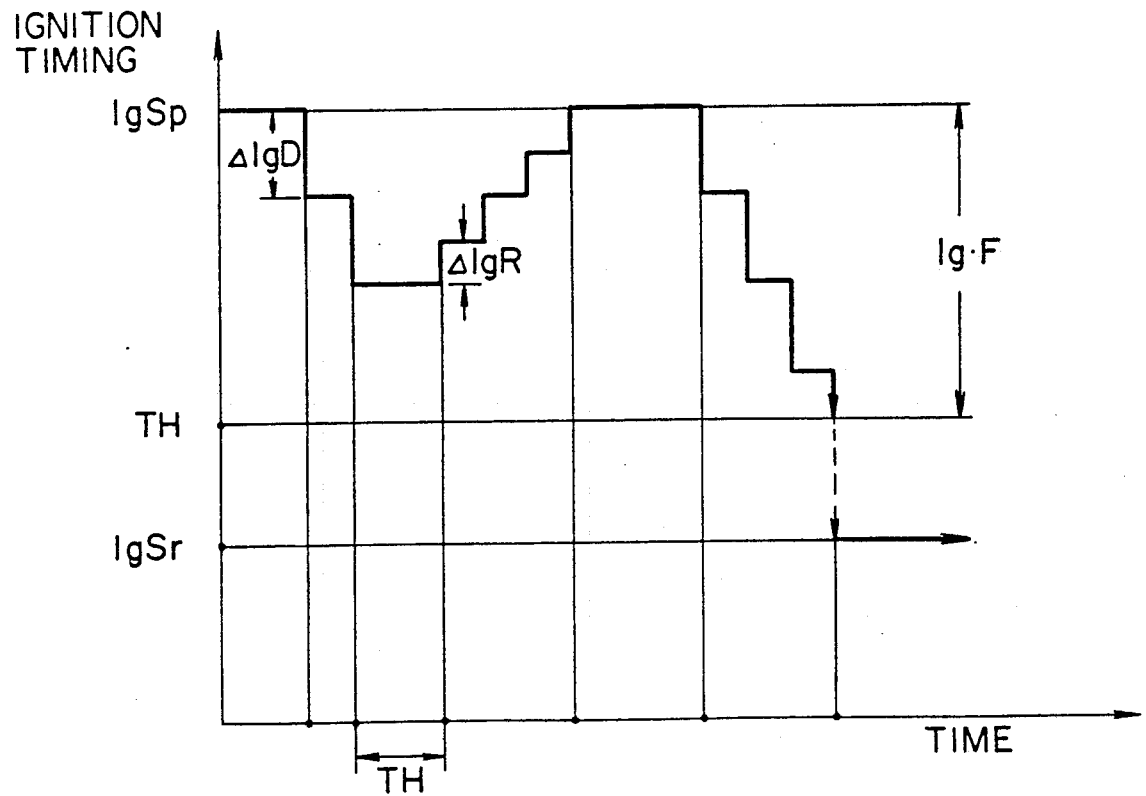
FIG. 3 is a timing chart showing ignition timing control in a first operating zone.

Referring to FIG. 3 illustrating a timing chart of the ignition timing control of the internal combustion engine E for the first operating zone I, the control unit 31 initially sets the ignition timing of the internal combustion engine E to a timing previously suitably specified for a premium gasoline that has a high octane rating, hereinafter referred to as a premium gasoline standard ignition timing IgPs. The control unit 31 reads outputs from the A/F sensor 29 and an engine speed sensor 34 to verify that the internal combustion engine E is being operated in an operating condition falling in the first operating zone I. If in fact the control unit 31 verifies an operating condition falling in the first operating zone I, it reads an output from the knock sensor 33 to detect knockings occurring in the internal combustion engine E. Upon detecting knockings, the control unit 31 changes stepwise the ignition timing of the internal combustion engine . E by a retardation in ignition timing (which is hereinafter referred to as a timing retardation) of $\Delta$IgD every time knocking is detected. Unless an accumulation of timing retardations $\Delta$IgD, referred to as an accumulated timing retardation $\Delta$Ig, exceeds a previously specified threshold timing retardation IgF, the control unit 31 adversely changes stepwise the ignition timing of the internal combustion engine E by an advance in ignition timing (which is hereinafter referred to as a timing advance) of $\Delta$IgR per unit time after the elapse of a previously specified holding time period TH with no detection of knocking from a last detection of knocking by the knock sensor 33. In this way, the ignition timing of the internal combustion engine E is alternately retarded stepwise from and advanced stepwise towards the premium gasoline standard ignition timing IgPs in accordance with the occurrence of knockings in the internal combustion engine E.

If the accumulated timing retardation $\Delta$Ig exceeds the threshold timing retardation IgF, the control unit 31 estimates or regards the gasoline now in use as regular, having a low octane rating. Then, the control unit 31 selects an ignition timing map for regular gasoline (which is hereinafter referred to an RGIT control map) to change the ignition timing of the internal combustion engine E to a standard ignition timing suitably previously specified for a regular gasoline having a low octane rating, hereinafter referred to as a regular gasoline standard ignition timing IgSr, from the premium gasoline standard ignition timing IgSp. It is to be noted that once the regular gasoline standard ignition timing IgSr is set, it is effectively maintained until the internal combustion engine E stops. In the case that the regular gasoline standard ignition timing IgSr has been set, because any retardation in ignition timing is no longer needed, even though the internal combustion engine E knocks, the accumulated timing retardation $\Delta$Ig is continuously kept at zero (0).

Figure 4:
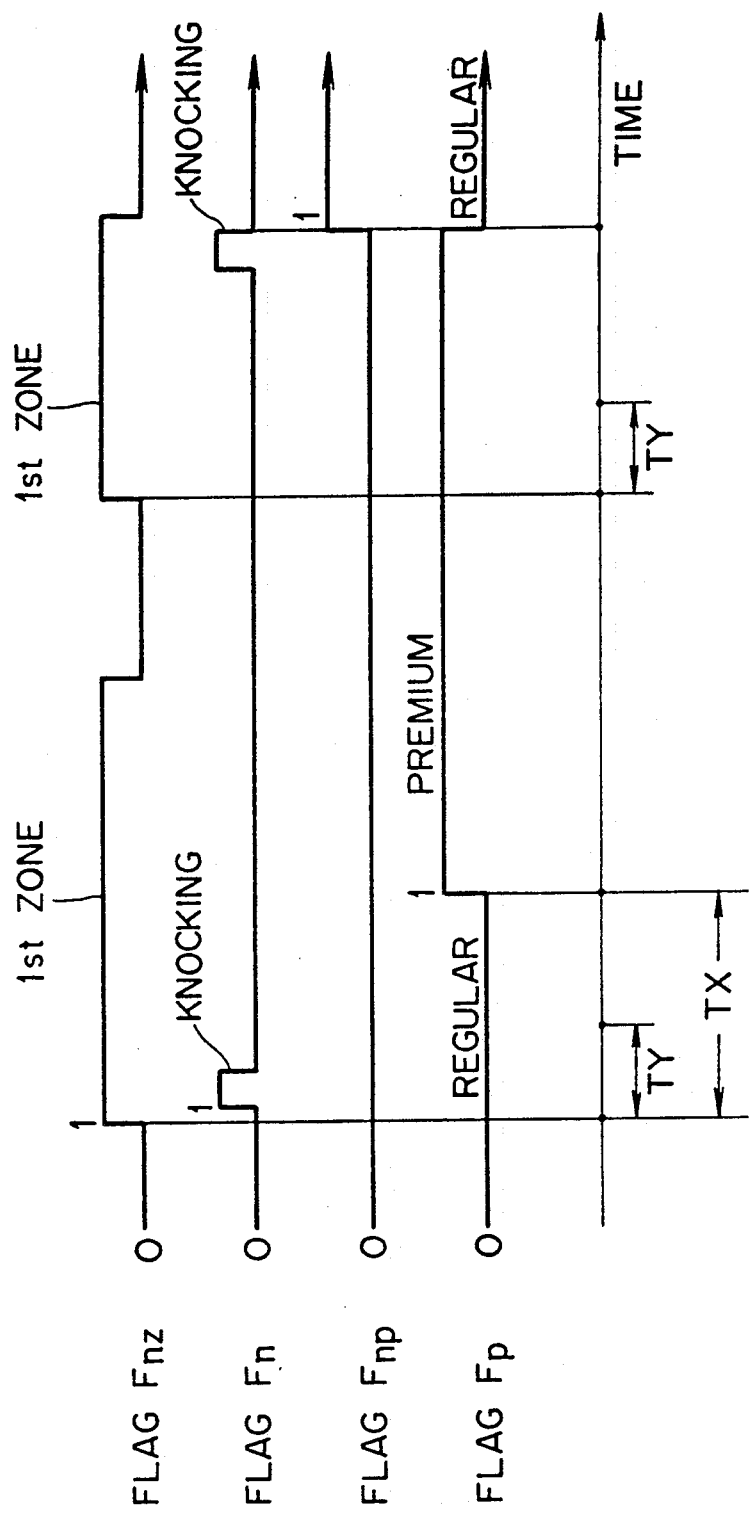
FIG. 4 is a timing chart showing ignition control in a second operating zone.

For the second operating zone II, the control unit 31 initially sets the ignition timing of the internal combustion engine E to the regular gasoline standard ignition timing IgSr. As shown in FIG. 4, if the control unit 31 verifies an operating condition in the first operating zone I, it detects occurrences of knockings in the internal combustion engine E based on outputs from the knock sensor 33. When no occurrence of knocking is detected for a predetermined holding time period TX after an operating condition of the internal combustion engine E falling in the first operating zone I has been created, then the control unit 31 selects an ignition timing map for premium gasoline (which is hereinafter referred to a PGIT control map) to change the ignition timing of the internal combustion engine E to the premium gasoline standard ignition timing IgSp. It is to be noted that because internal combustion engines generally encounter a single occurrence of knocking upon an abrupt transition of engine operating condition into the first operating zone I, such a single occurrence of knocking should be ignored. To ignore the single occurrence of knocking upon an abrupt transition of engine operating condition into the first operating zone I, the control unit 31 is adapted not to detect any output from the knock sensor 33 for a predetermined holding time period TY, which is relatively short, immediately after the transition of engine operating condition into the first operating zone I.

After the change of the ignition timing of the internal combustion engine E to the premium gasoline standard ignition timing, the control unit 31 reads outputs from the knock sensor 33 so as to detect knockings caused in the internal combustion engine E every transition of engine operating condition of the internal combustion engine E into the first operating zone I. Whenever any knocking is detected after the elapse of the predetermined holding time period TY, the control unit 31 selects the RGIT control map to change the ignition timing of the internal combustion engine E to the regular gasoline standard ignition timing IgSp. Once the regular gasoline standard ignition timing is set, it is maintained until the internal combustion engine E stops.

In the third operating zone III where knockings possibly occur, the internal combustion engine E is substantially independent of the difference in octane rating between regular and premium gasoline. Consequently, in the third operating zone III, the ignition timing of the internal combustion engine E may be always set to and maintained at either the premium gasoline standard ignition timing IgSp or the regular gasoline standard ignition timing IgSr. Otherwise, the standard ignition timing of the internal combustion engine E may be changed either simultaneously with the transition of operating condition into the first operating zone I or the transition of engine operating condition into the second operating zone II. In this invention, the standard ignition timing of the internal combustion engine E is changed precisely at the same time as the transition of engine operating condition into the second operating zone II.

Figure 5:
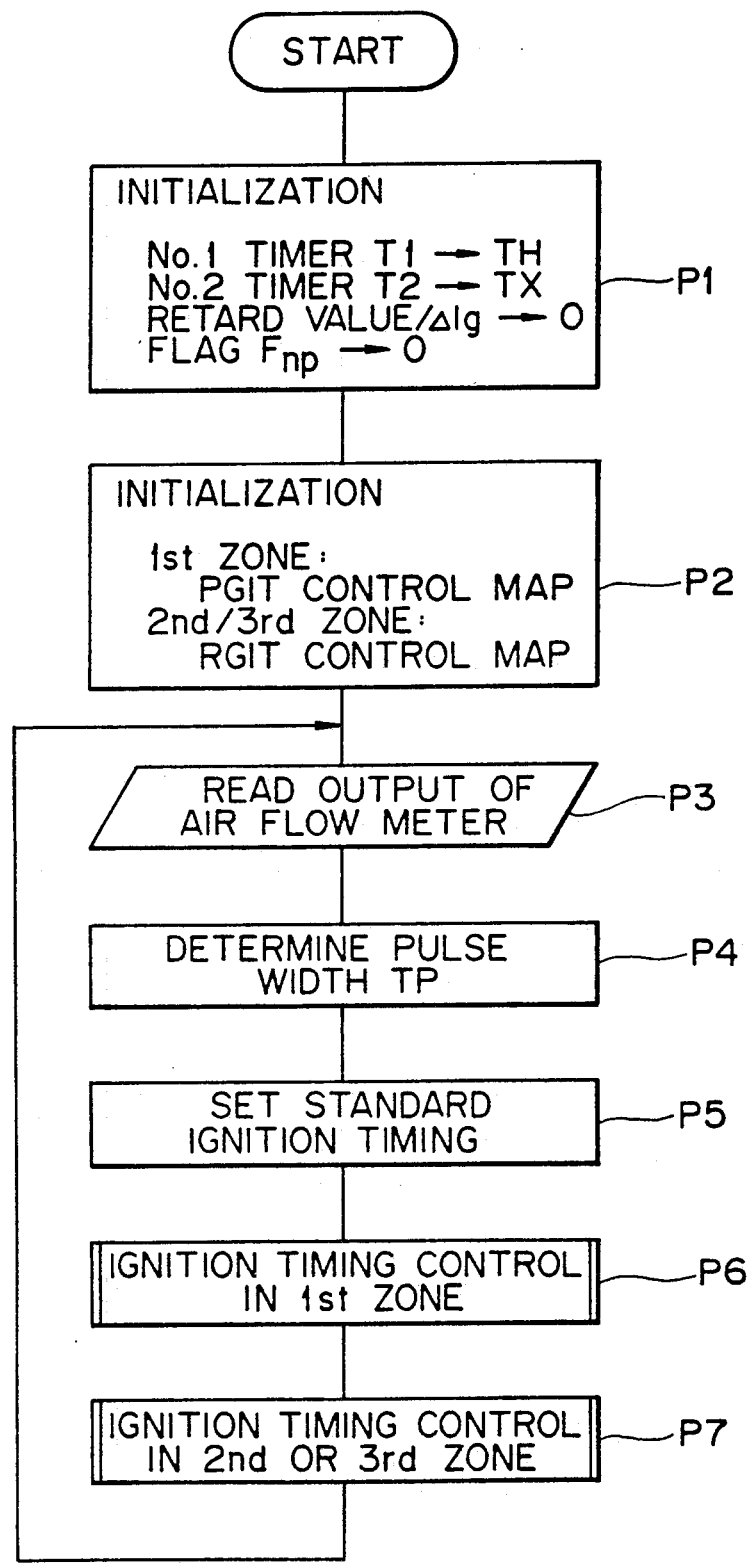
FIGS. 5 to 7 are flow charts illustrating ignition control sequences for a computer which controls operation of the internal combustion engine shown in FIG. 1.
Figure 6:
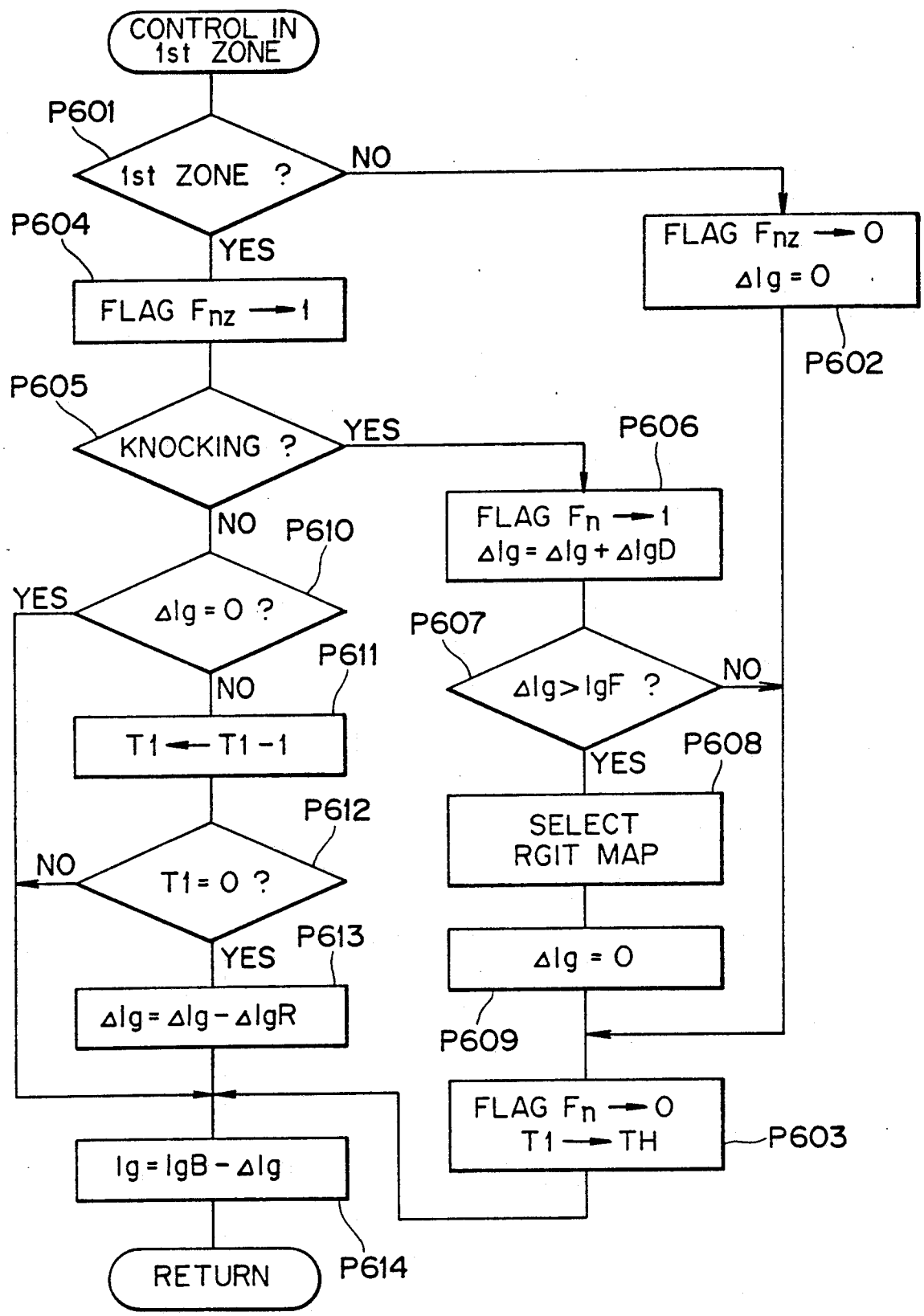
Figure 7:
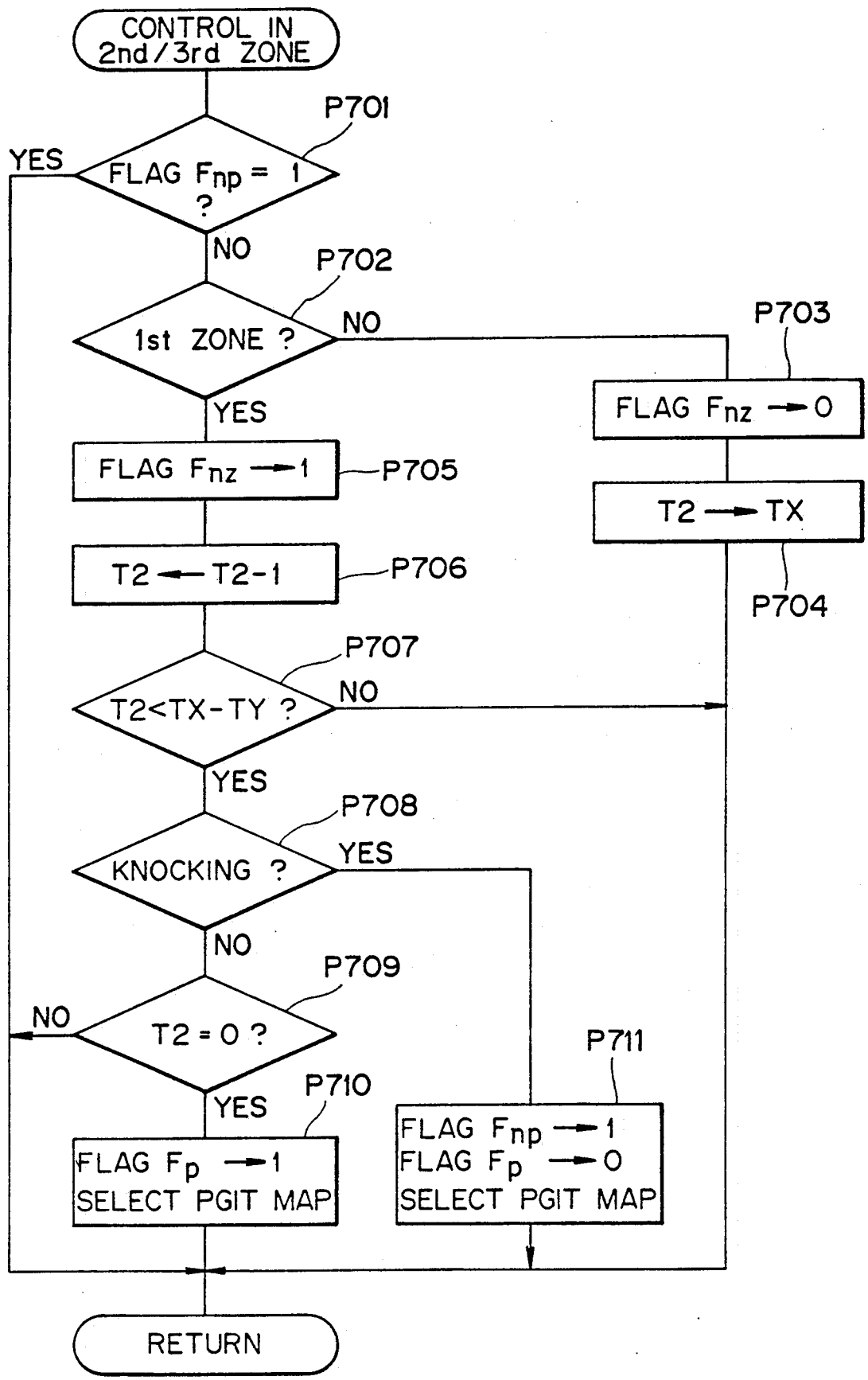

Control of the internal combustion engine by the engine control system illustrated in FIGS. 1 to 4 is best understood by reviewing FIGS. 5 to 7, which are flow charts illustrating various routines for the microcomputer of the control unit 31. Programming a computer is a skill well understood in the art. The following description is written to enable a programmer having ordinary skill in the art to prepare an appropriate program for the microcomputer of the control unit 31. The particular details of any such program would of course depend upon the architecture of the particular computer selected.

Referring now to FIG. 5, which is a flow chart of the main or general sequence routine for the microcomputer of the control unit 31, the main routine starts upon switching on an ignition switch (not shown) and initializes the engine control system in first and second steps P1 and P2. That is, No. 1 and No. 2 timers T1 and T2 for counting down the holding time period are set to values corresponding to the holding time periods TH and TX, respectively. The accumulated timing retardation (retard value) $\Delta$Ig is set to zero (0) and a non-premium flag $F_{np}$ is reset ($F_{np}=0$). When the non-premium flag $F_{np}$ is set ($F_{np}=1$), the control unit 31 inhibits the setting of the premium gasoline standard timing IgSp. Further, for the first operating zone I, the PGIT control map is initially selected to set the premium gasoline standard ignition timing IgSp and, for the second and third zones II and III, the RGIT control map is initially selected to set the regular gasoline standard ignition timing IgSr.

After the initialization, an output from the air flow meter 24 is read in a step P3 to determine pulse width TP so as to deliver a correct air-fuel ratio for a given engine demand in a step P4. In a step P5, the standard ignition timing IgB (which is the premium gasoline standard ignition timing IgSp or the regular gasoline standard ignition timing IgSr) is read with reference to the ignition timing control map selected in a manner which will be described later. Thereafter, ignition timing control is effected for the first operating zone I in a step P6 and for the second and third operating zones II and III in a step P7, as will be described later.

Referring to FIG. 6, which is a flow chart of a ignition timing control subroutine for the microcomputer of the control unit 31 for controlling ignition timing in the first operating zone I, the first step P601 in FIG. 6 is to decide whether or not the internal combustion engine E is operated in a condition falling in the first operating zone I. If the answer is no indicating the current operating condition is not in the first operating zone I, the control unit 31 resets a knock zone flag $F_{nz}$ ($F_{nz}=0$) and sets the accumulated timing retardation $\Delta Ig$ to zero (0) in a step P602. The knock zone flag $F_{nz}$ indicates that knockings are detected in the first operating zone I when set ($F_{nz}=1$), or in the second or third operating zone II or III when reset ($F_{nz}=0$). Thereafter, the control unit 31 resets the knock flag $F_n$ ($F_n=0$) and the No. 1 timer T1 to its initial value corresponding to the predetermined holding time TH, in a step P603. The practical ignition timing Ig is obtained by retarding the standard ignition timing IgB (=IgSp) by the accumulated timing retardation $\Delta Ig$. In this case, because of the accumulated timing retardation $\Delta Ig$ set to zero (0), the premium gasoline standard ignition timing IgSp is maintained as the practical ignition timing Ig.

On the other hand, if the answer to the first decision in the step P601 is yes, then, outputs from the knock sensor 33 is read to detect knockings in the internal combustion engine E in a step P605 after setting the knock zone flag $F_{nz}$ ($F_{nz}=1$) in a step P604. If a knocking is detected, a knock flag $F_n$ is set ($F_n=1$) and the latest accumulated timing retardation $\Delta Ig$ is renewed by adding the retarding time $\Delta IgD$ to the accumulated timing retardation $\Delta Ig$ in a step P606. Thereafter, a decision is made in a step P607: "is the accumulated timing retardation $\Delta Ig$ greater than the threshold timing retardation Ig F?" If the answer to the decision is no, then, the program forwards to the step P603 to reset the knock flag $F_n$ to zero (0) and the timer T1 to the initial value TH. This procedure taking the step P603 following the steps P605, P606 and P607 in order is carried out to change increasingly stepwise the latest total time of retardation $\Delta Ig$ by the retarding time $\Delta IgD$ every occurrence of knocking in the internal combustion engine E.

If the answer to the decision in the step P605 is no, indicating no occurrence of knocking in the internal combustion engine E, then a step P610 is taken to decide whether or not the latest accumulated timing retardation $\Delta Ig$ is zero. If the answer to the decision is no, this indicates that the ignition timing is somewhat retarded but has not yet been retarded to the threshold timing retardation IgF, then the No. 1 timer changes its current count value T1 by a decrement of one (1) in a step P611. Following this decrement, the current count value T1 of the No. 1 timer is examined as to whether or not it is zero in a step P612. If the answer is no, this indicates that the predetermined holding time TH has not yet elapsed after the latest occurrence of knocking in the internal combustion engine E. Then the program jumps directly to the step P614 to set the practical ignition timing Ig. On the other hand, if the answer to the decision regarding the current count value T1 of the No. 1 timer is yes, a step P613 is taken to renew or advance the current ignition timing by decreasing the latest accumulated timing retardation $\Delta Ig$ by an decrement of a predetermined timing advance $\Delta IgR$ and then the step P614 is taken to set the practical ignition timing Ig. This procedure through the steps P612 and P613 in order is taken to advance stepwise the latest accumulated timing retardation $\Delta Ig$ by an increment of the timing advance IgR every time the predetermined time period elapses.

If the answer to the decision regarding the accumulated timing retardation $\Delta Ig$ relative to the threshold timing retardation IgF in the step P607 is yes, this indicates that the accumulated timing retardation $\Delta Ig$ has exceeded the threshold timing retardation Ig F, that is, knockings have continually been caused in the internal combustion engine E as many times as a predetermined level of frequency of knockings. The control unit 31 then cancels and resets the accumulated timing retardation $\Delta Ig$ to zero (0) in a step P609 after selecting the regular gasoline ignition timing (RGIT) control map in place of the premium gasoline ignition timing (PGIT) control map in a step P608. Thereafter, the practical ignition timing Ig is calculated from IgB−$\Delta Ig$ in the step P614 after taking the step P603 to reset the knock flag $F_n$ ($F_n=0$) and the No. 1 timer T1 to the initial value TH. The final step P614 orders return to the maine routine. In any case in the ignition timing control subroutine for the first operating zone I, the control unit 31 operates the internal combustion engine E to fire at the practical ignition timing Ig obtained in the final step P614.

Referring to FIG. 7, which is a flow chart of the ignition timing control subroutine for the microcomputer of the control unit 31 for controlling ignition timing in the second operating zone II or the third operating zone III, the first step P701 in FIG. 7 is to make a decision: "has the non-premium flag $F_{np}$ been set ($F_{np}=1$)?" Because the non-premium flag $F_{np}$ is initially reset ($F_p=0$), the answer to the decision in the step P701 is almost always no, and then another decision is made in a step P702: "is the engine operating condition in the first operating zone I?" If the answer to the decision in the step P702 is no, the No. 2 timer T2 is set to the initial count value corresponding to the predetermined holding time TX in a step P704, after resetting the knock zone flag $F_{nz}$ ($F_{nz}=0$) in a step P703. Then, the step P704 orders return to the main routine. In the main routine, the control unit 31 reads an output from the air flow meter 24 in the step P3.

If the answer to the decision in the step P702 is yes, the No. 2 timer T2 counts down to decrease the count value T2 by one in a step P706, after setting the knock zone flag $F_{nz}$ ($F_{nz}=1$) in a step P705. After the step of counting down, a step P707 is taken to make a decision whether or not the count value of the No. 2 timer T2 is smaller than a value of TX−TY. If the answer to the decision is no, this indicates that the holding time period TY, which is relatively short, has not elapsed after the transition of engine operating condition into the first operating zone I. Then, the step P707 orders return directly to the main routine because there is no necessity for changing the ignition control map. On the other hand, if the answer to the decision regarding the elapse of the predetermined holding time is yes, a decision is further made in a step P708: "is a knocking detected?" If the answer to the decision is no, indicating that no knocking occurs in the internal combustion engine E, a final decision is made in a step P709: "has the No. 2 timer counted down to zero (0)?" If the answer to the final decision is yes indicating that the holding time period TX has elapsed (as evidenced by the value of the timer counted down to zero) after the transition of engine operating condition into the first operating zone I, the control unit 31 sets a premium gasoline flag $F_p$ ($F_p=1$) in a step P710 to select the PGIT control map. Then, the step P710 orders return to the main routine.

If the answer to the decision in the step p708 regarding detection of knocking is yes, the control unit 31 sets the non-premium flag $F_{np}$ ($F_{np}=1$) and resets the premium gasoline flag $F_p$ ($F_p=0$) to select the RGIT control map in a step P711. Once the non-premium gasoline flag $F_{np}$ is set, the answer to the decision in the step P701 is always yes Accordingly, the step P701 orders return directly to the main routine. As apparent from this direct return to the main routine from the step P701, once the non-premium gasoline flag $F_{np}$ is set, the control unit 31 holds the RGIT control map unless the internal combustion engine E stops.

Step P711 orders return to the main routine. In the main routine, the control unit 31 reads an output from the air flow meter 24 in the step P3.

The invention has been described in detail with particular reference to preferred embodiments thereof, but the engine control value may be supercharging pressure or the like desirable to be changed according to gasoline grades having different octane ratings.

It should be noted that various changes and modifications are apparent to those skilled in the art which are within the scope of the invention, and such changes and modifications are intended to be covered by the following claims.

What is claimed is:

1. An engine control system for controlling an engine control value, at which an internal combustion engine is operated, according to a grade of gasoline delivered into said internal combustion engine, said control system comprising:
   a knock sensor for detecting knockings caused in said internal combustion engine;
   engine operating condition detecting means for detecting if an engine operating condition, over a predetermined engine load, falls in a first operating zone for knocking detection ranging under a predetermined engine speed or in a second operating zone for knocking detection ranging over said predetermined engine speed;
   grade determining means for determining, only when said engine operating condition detecting means detects an engine operating condition in said first operating zone, if gasoline delivered in said internal combustion engine has a high grade or a low grade, based on frequency levels of knockings continually detected by said knock sensor;
   first control value changing means for setting said engine control value to a first standard engine control value suitable for gasoline having a high grade and changing said engine control value from said first standard control value every time said knock sensor detects knockings, when said engine operating condition detecting means detects an engine operating condition in said first operating zone; and
   second control value changing means for setting said engine control value to a second standard engine control value suitable for gasoline having a low grade when said engine operating condition detecting means detects an engine operating condition in said second operating zone, and when said knock sensor detects knockings within a predetermined period from a transition of said engine operating condition to said first operating zone.

2. An engine control system as defined in claim 1, wherein said engine control value is ignition timing.

3. An engine control system as defined in claim 1, wherein said engine control value is supercharging pressure.

4. An engine control system as defined in claim 2, wherein said ignition timing is initially set to said first standard engine control value suitable for a grade of gasoline having a high octane rating in said first zone and to said second standard engine control value suitable for a grade of gasoline having a low octane rating in said second operating zone.

5. An engine control system as defined in claim 2, wherein said grade determining means determines a grade of gasoline delivered in said internal combustion engine as having a low octane rating when said knock sensor continually detects knockings at a frequency higher than a first level of frequency of knockings in said first operating zone.

6. An engine control system as defined in claim 5, wherein said first control value changing means changes said standard engine control value initially set to said second standard value in said first operating zone when said knock sensor continually detects knockings more than said first level of frequency of knockings in said first operating zone.

7. An engine control system as defined in claim 6, wherein said second standard engine control value is, once set in said first operating zone, maintained unchanged until the engine stops 8. An engine control system as defined in claim 5, wherein said first control value changing means changes an ignition timing stepwise by a predetermined timing retardation from said first standard engine control value for every knocking detected by said knock sensor unless said knock sensor continually detects more than said first level of frequency of knockings in said first operating zone.

9. An engine control system as defined in claim 8, wherein said first control value changing means changes an ignition timing stepwise by a predetermined timing advance from a retarded ignition timing for every first predetermined holding time period from an elapse of a second predetermined holding time period after a last detection of knocking by said knock sensor.

10. An engine control system as defined in claim 2, wherein said grade determining means determines a grade of gasoline delivered in said internal combustion engine as having a high octane rating when said knock sensor detects knockings at a second level of frequency of knockings in said first operating zone.

11. An engine control system as defined in claim 10, wherein said second control value changing means changes said standard engine control value initially set to said first standard value in said first operating zone when said knock sensor detects no knocking for a third predetermined holding time period.

12. An engine control system as defined in claim 10, wherein said second control value changing means changes ignition timing to said second standard engine control value in said first operating zone when said knock sensor detects knockings at said second level of frequency of knockings.

13. An engine control system as defined in claim 12, wherein said second control value changing means changes ignition timing to said second standard engine control value in said first operating zone when said knock sensor detects knockings at said second level of frequency of knockings.

14. An engine control system as defined in claim 13, wherein said second standard engine control value is maintained in said first operating zone until the engine stops.

15. An engine control system as defined in claim 2, wherein said knock sensor ignores a first knocking caused in a predetermined time period after a transition of engine operating condition from said second operating zone to said first operating zone.

16. An engine control system as defined in claim 15, wherein said second level of frequency of knockings is one.

* * * * *